R. A. CAMPBELL.
Feed Rack.
No. 22,062.
Patented Nov. 16, 1858.
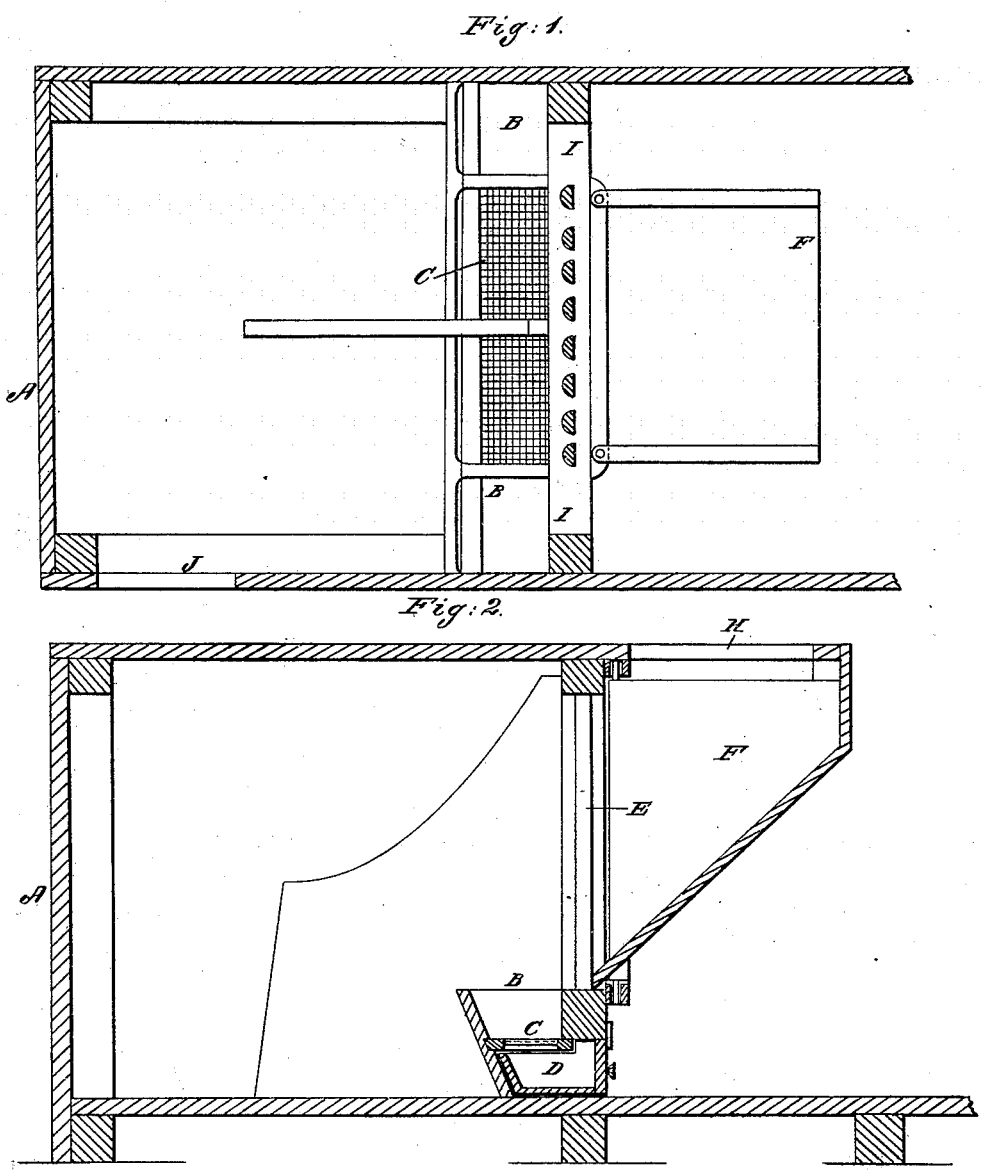

UNITED STATES PATENT OFFICE.

R. A. CAMPBELL, OF SALEM, INDIANA.

DEVICE FOR SAVING THE SEED FROM HAY FED TO STOCK.

Specification of Letters Patent No. 22,062, dated November 16, 1858.

*To all whom it may concern:*

Be it known that I, ROBERT A. CAMPBELL, of Salem, in the county of Washington and State of Indiana, have invented a new and useful Method of Saving Grass-Seed While Feeding Hay to Animals; and I do hereby declare that the following is a full, clear, and exact description of the same, reference being had to the accompanying drawings, forming a part of this specification, in which—

Figure 1, is a horizontal section of a horse's stall with my improvement applied to it. Fig. 2, is a vertical longitudinal section of the same.

Similar letters of reference, in each of the several figures, indicate corresponding parts.

The nature of my invention consists in the combination of the inclined conducting passage, intermediate hay rack and trough having a grated or sieve bottom and a sliding drawer or seed receptacle whereby the grass seed which escapes from the hay as it descends from the loft or while being drawn through the rack is collected and saved in a perfect state as will be presently shown.

To enable others, skilled in the art to make and use my invention, I will proceed to describe its construction and operation.

A, A, represent a stable with two or more horse stalls.

B, B, are two troughs for the horses to eat oats, &c., from as usual. C, C, are intermediate continuations of these troughs. The bottom of the intermediate portion C. C, is reticulated or grated as shown.

D, is a sliding drawer placed under the trough and opening from the rear of the stall or outside of the stable.

E, is a hay rack arranged behind the trough instead of overhanging it, as commonly.

F, is an inclined conducting passage leading down from the opening G, of the hay loft, as shown, and serving to conduct the hay from this point to the rack.

I, I are ventilating openings at the rear of the stall and J, an entrance door to the stable.

From the above description of parts, it will be seen that if hay is supplied through the opening H, from the loft, it will slide down against the rack, and that whatever grass seed escapes from it as it is drawn through the rack by the horses will fall into the intermediate trough C, C, and escape through the meshes or reticulations of its bottom into the sliding drawer D, and thus be saved in a perfect state. The intermediate sieve bottom trough also serves for retaining whatever hay may fall through the rack until it is eaten by the horses and thus the waste of hay from its falling upon the floor of the stall and being trampled upon by the horses, is avoided. All dust, &c., which may be mixed with the hay passes through the sieve bottom and the horses thus saved from being injured by inhaling it.

To save the grass seed is quite an item of economy with the farmer and the annoyance of having the seed mixed with the manure and springing up over the soil which is fertilized by it completely overcome.

What I claim as my invention and desire to secure by Letters Patent, is—

The combination of the inclined conducting passage F, intermediate hay rack E, and sieve bottom trough B, C, C, substantially as and for the purposes set forth.

ROBERT A. CAMPBELL.

Witnesses:
 DANIEL KNIGHT,
 J. P. BANTA.